United States Patent

[15] 3,676,704

[45] July 11, 1972

Donofrio et al.

[54] MONOLITHIC MEMORY SENSE AMPLIFIER/BIT DRIVER

[72] Inventors: Nicholas M. Donofrio, Wappingers Falls; Jehoshua N. Pomeranz, Monsey, both of N.Y.

[73] Assignee: International Business Machines Corporation, Armonk, N.Y.

[22] Filed: Dec. 29, 1970

[21] Appl. No.: 102,368

[52] U.S. Cl. ..............................307/235, 307/270, 330/30 D

[51] Int. Cl. ..............................H03k 5/20

[58] Field of Search ..............................307/235, 270; 330/30 D

[56] References Cited

UNITED STATES PATENTS

| | | | |
|---|---|---|---|
| 3,399,357 | 8/1968 | Weilerstein | 330/30 D |
| 3,466,630 | 9/1969 | Mayne et al. | 330/30 D |
| 3,538,444 | 11/1970 | Adlhoch | 307/235 X |

*Primary Examiner*—John Zazworsky
*Attorney*—Hanifin and Jancin and James E. Murray

[57] ABSTRACT

This specification describes a sense amplifier/bit driver circuit for a monolithic memory storage cell with a double ended output. The sense amplifier consists of two shunt feedback amplifiers connected differentially across the double ended output of the storage cell. There is a resistive connection between the outputs of the two shunt feedback amplifiers to make each input of the two shunt feedback amplifiers relatively insensitive to large changes at the other input. The bit driver for the circuit contains two current switch circuits for controlling the potential at each end of the double ended output of the storage cell. These current switch circuits are cross-coupled by a transistor which eliminates the need for inverting one of the control pulses to the bit driver.

5 Claims, 1 Drawing Figure

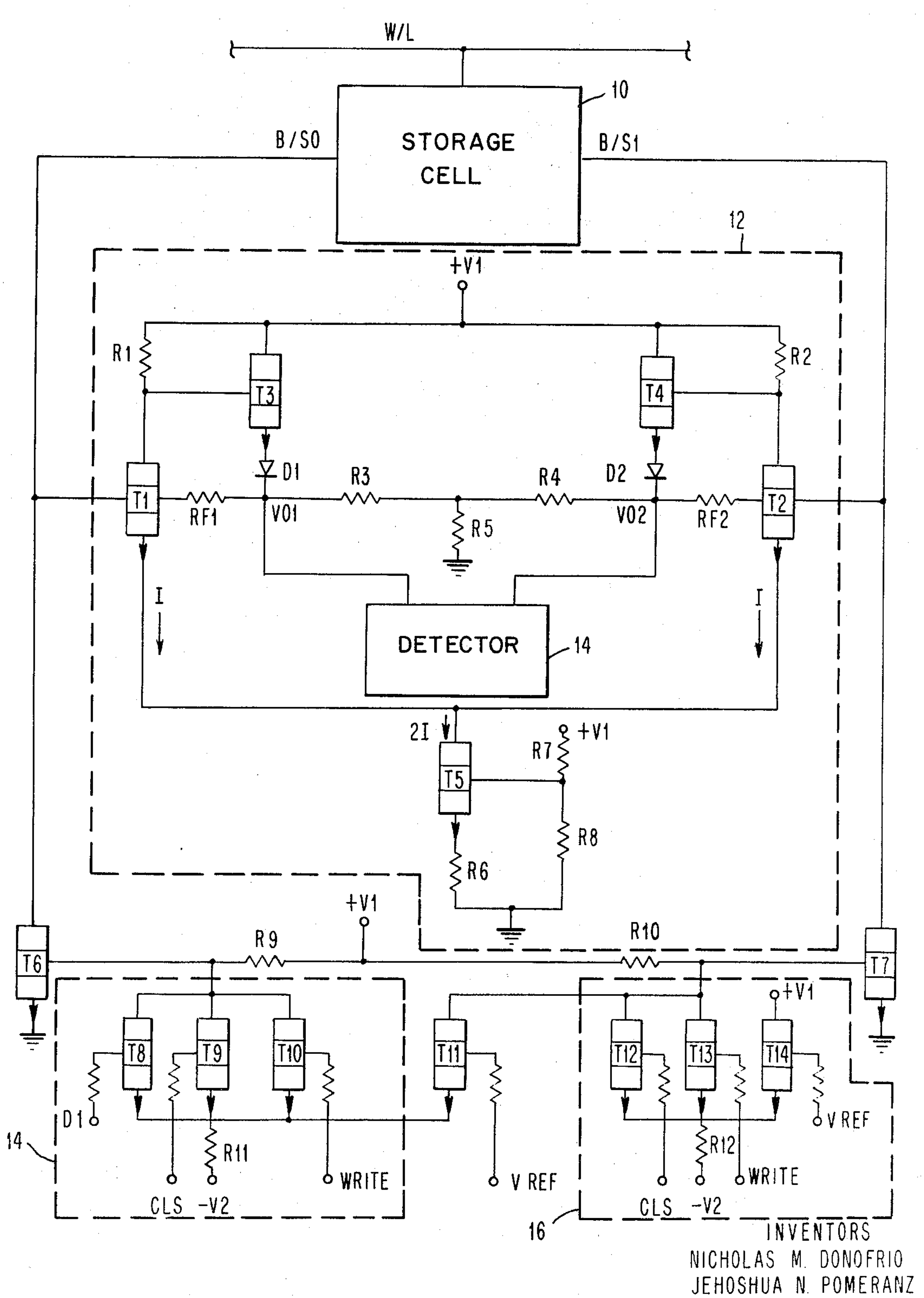
INVENTORS
NICHOLAS M. DONOFRIO
JEHOSHUA N. POMERANZ
BY James E. Murray
ATTORNEY

MONOLITHIC MEMORY SENSE AMPLIFIER/BIT DRIVER

BACKGROUND OF THE INVENTION

This invention relates to sense amplifiers and more particularly to sense amplifiers for detecting the differential outputs from monolithic memory cells.

Shunt feedback amplifiers have features which make them desirable in sense amplifiers. For instance, they have low input impedances and high gains. The difficulty with them is that when two of them are connected together differentially to sense a signal between two bit lines of a monolithic memory cell they tend to couple the two bit lines together so that the voltage on the bit lines cannot be varied independently of one another. This makes the writing of data in the cell extremely difficult or impossible.

In accordance with the present invention this dependency of the voltage at the inputs of a differential amplifier upon one another is markedly reduced or completely eliminated. This is accompanied by a resistive connection between the outputs of two shunt amplifiers that feeds the output of either one of the shunt amplifiers to the output of the other shunt amplifier to maintain the voltage at the input of the second mentioned shunt amplifier at its quiescent level when the voltage at the input of the first mentioned shunt amplifier is changed during writing of data into the cell.

Another aspect of the invention relates to the circuits for actually driving the bit lines on the memory cell up and down. In the drive system of the present circuit, the bit lines are normally maintained at some quiescent level. However, when data is to be written into the storage cell either one of the bit lines to the storage cell is driven down while the other is maintained at a quiescent level. When this occurs a "1" or a "0" is stored in the cell depending on which of the bit lines is lowered. To accomplish these variations in bit line voltages, it is possible to use two separate current switch circuits for controlling the data on each of the bit lines independently of the other. This would require providing a data signal to each of the current switch circuits. One of the current switch circuits has to receive a data signal indicative of storing a "1" to store a "1" in the cell while the other current switch circuit would have to receive the inverse of that signal to indicate a "0" is to be stored when a "0" is to be stored. This requires an inverter circuit to provide the inverse signal.

In accordance with the present invention the need for the inverter circuit is eliminated by the cross-coupling of the two current switch circuits so as to insure that one is turned on when the other is turned off and vice versa. This decreases the area on a monolithic chip necessary for the bit drive circuits and also reduces the power consumption of the bit drive circuits.

Therefore, it is an object of the present invention to provide a new sense amplifier.

It is another object of the present invention to provide a new bit driver circuit.

It is a further object of the present invention to provide a new sense amplifier/bit driver combination.

It is a further object of the invention to provide bit drivers and sense amplifiers that are expressly for reading signals out of storage cells formed on monolithic chips.

It is a further object of the invention to provide a differential sense amplifier using shunt feedback amplifiers in which the input voltages at the inputs of the amplifier are relatively independent of one another.

DESCRIPTION OF THE DRAWINGS

These and other objects, features and advantages of the invention will be apparent from the following more particular description of the preferred embodiment of the invention as illustrated in the accompanying FIGURE showing a schematic of a bit driver/sense amplifier of the present invention coupled to a storage cell and a detector.

GENERAL DESCRIPTION OF THE INVENTION

Referring to the FIGURE, data is written into and read out of the storage cell 10 by controlling and detecting the potentials on the word line W/L and the bit lines B/SO and B/S1. The invention here is concerned with the controlling potentials and detecting current on the bit lines B/SO and B/S1 and nothing further will be said about the potential on the drive line W/L or of the configuration of the storage cell since they are conventional.

The sense amplifier 12 shown in the circuit schematic is composed of two current sensing shunt feedback amplifiers each with a common emitter and a common collector stage. One of the shunt feedback amplifiers includes transistors T1 and T3 and the other shunt feedback amplifier includes transistors T2 and T4. These amplifiers are connected together in a differential configuration for detecting the difference between the current flowing in the B/SO sense line and that flowing in the B/S1 sense line. If the B/SO sense line current is larger than the B/S1 sense line current the sense amplifier 12 will provide a signal of one polarity to the detector 14 to indicate that a binary "0" is stored in the storage cell 10 while if the B/S1 sense line current is larger than the B/SO sense line current, the sense amplifier 12 will provide a signal of the opposite polarity indicating that a "1" is stored in the storage cell. The gain of each of the shunt feedback amplifiers is a direct function of its feedback resistor RF1 or RF2. This can be illustrated with simple feedback analysis and shall not be gone into here. Thus, the output voltage difference (V01–VO2) of the shunt feedback amplifiers is a function of the current difference on the bit lines B/SO and BS/1 times the feedback resistance of resistor RF1 or RF2, since RF1 = RF2. VO1 will be more positive than VO2 when current flows into the cell on bit line B/SO. VO2 will be more positive when current flows in B/S1. Since the value of resistors RF1 and RF2 can be varied, they are selected to yield a voltage difference that will be sufficient to trip detector circuit 14 at the desired current differential between the bit lines.

When data is not being read into or read out of the storage cell 10, the potentials on the B/SO and B/S1 sense lines are substantially equal. The sensing circuit is fabricated on a monolithic chip. The tracking characteristics of circuit elements formed on the same chip assures that the emitter currents of the transistors T1 and T2 be substantially equal and, therefore, the voltage differential V01 and VO2 will be approximately almost zero during the quiescent state of the amplifier.

As pointed out previously, when the voltages differ the outputs of the two circuits will be equal to the current flowing through resistor RF1 times the resistance of resistor RF1 minus the current flowing through resistor RF2 times the resistance of resistor RF2. Because the shunt feedback amplifiers make it easy to provide the desired differential output voltage by the selection of the feedback resistances in the manner described above, it is quite desirable for its present use. Furthermore, the shunt feedback amplifier has the other advantages of providing a low input impedance. For bit lines that are heavily loaded with capacitance, the low input impedance minimizes the effect of the capacitance and permits fast amplifier response. However, when shunt feedback amplifiers are differentially connected as shown in the FIGURE they have the disadvantage that the voltage at the base of transistor T1 affects the voltage at the base of transistor T2 and vice versa. In operation of the storage cell it is quite important that during the writing of data into the cell, that the voltages of the B/SO and B/S1 sense lines be varied independently of one another. For this reason the interdependency of the voltages at the inputs of the shunt amplifiers has limited the use of shunt feedback amplifiers in differential sense amplifiers.

The interdependency of the voltages at the inputs to the amplifiers can be easily seen. Transistor T5 in conjunction with resistors R6, R7 and R8 act as a current source for the differential sense amplifier. Assume now that the potential at the base of transistors T1 and T2 is equal, then current flowing to the collector of transistor T5 is derived in equal halves from the emitters of transistors T1 and T2 since transistors T1 and T2 will be conducting equally. Now, suppose that during a write operation the B/SO sense line is dropped to zero. This will cause transistor T1 to conduct less thereby causing more current to flow from the emitter of transistor T2. When this occurs the voltage drop across resistor R2 increases thereby causing transistor T4 to conduct less and lower the output potential at output VO2. Since the output of VO2 is connected to the bit line B/S1 by the resistor RF2 this means that the potential on the B/S1 sense line drops with the potential on the B/SO sense line.

In accordance with the present invention this interdependency of input potentials of all differentially connected shunt amplifiers is overcome by the interconnection of the outputs VO1 and VO2 with resistors R3, R4 and R5. Now, when the potential at the base of transistor T1 drops it results in a decrease of the voltage drop across resistor R1. This causes transistor T3 to conduct more and raise the potential at the output VO1. The potential of the output VO1 is now fed through resistors R3 and R4 to the output VO2 so as to compensate for the drop occurring due to the differential coupling of the two shunt feedback amplifiers. Resistors R3, R4 and R5 also provide an additional function of current dump for the outputs VO1 and VO2 of the shunt feedback amplifiers during the reading and writing.

So far we have described how the sense amplifier 12 detects data stored in the storage cell 10 and how it reacts when voltages on the B/SO and B/S1 sense lines are varied during writing of data into the storage cell 10. This variation during writing is controlled by the conductance and nonconductance of transistors T6 and T7 which, in turn, are determined by the operation of the two current switch circuits 14 and 16 cross-coupled by transistor T11.

During the quiescent state of the cell and during reading data from the cell, transistors T6 and T7 are maintained nonconductive by the conduction of one of transistors T8–T10 and one of transistors T12–T13 in each of the current switch circuits 14 and 16. This back-biases the base-to-emitter junctions of transistors T6 and T7 so that transistors T6 and T7 are maintained off and therefore nonconducting.

Assume now that a binary "1" is to be written into the cell. Then a D1 pulse which is a pulse indicating that a binary "1" is to be stored, and a CLS pulse which is a clocking pulse, are first applied to transistors T8, T9 and T12 turning those transistors off and leaving transistors T10 and T13 on. At some time thereafter a write pulse is applied to transistors T10 and T13 turning transistors T10 and T13 off. When transistor T10 turns off the current supplied from the current source consisting of resistor R11 and the voltage source −V2 flows through transistor T11 so that transistor T11 conducts while transistors T8, T9, T10, T12 and T13 are biased off. Thus the base of transistor T6 is allowed to rise to some potential determined by the potential of the source +V1 and resistance of the resistor R9 which allows transistor T6 to conduct. At the same time transistor T7 is held off by the conductance of transistor T11. This satisfies the requirement for writing a "1" into the storage cell.

To write a binary "0" into the storage cell the same process occurs except that no D1 pulse is supplied to the base of transistor T8. A CLS pulse is first applied to the base of transistors T9 and T12 causing them to conduct. Thereafter a write pulse is applied to the base of transistors T10 and T13. This leaves transistors T8 and T14 conducting while transistors T9, T10, T11, T12 and T13 are biased nonconductive. Since transistor T8 is conducting it means that transistor T6 will be biased nonconducting because the potential at the base of transistor T6 is sufficiently low to maintain transistor T6 off. At the same time transistor T7 is allowed to conduct because all the transistors T11, T12 and T13 coupled to its base are off and allow a potential determined by the voltage source V1 and the resistance of resistor R10 to bias the transistor T7 conductive. This satisfies the requirements of writing a "0" into the storage cell.

While the invention has been shown and described with reference to a preferred embodiment thereof it will be understood by those skilled in the art that various changes in form and details may be made therein without departing from the spirit and scope of the invention.

What is claimed is:

1. A circuit for differentially sensing an output signal from a memory storage cell when data in the cell is to be read comprising:

a separate input means for the receipt of each of the signals to be differentially sensed;

a separate shunt feedback amplifying means coupled to each of said separate input means for separately amplifying each of the signals to be sensed and current an output signal to be detected at a separate output terminal;

current source means differentially coupling the shunt feedback amplifying means together so that current supplied to one of the shunt feedback amplifying means depends on the current supplied to the other shunt feedback amplifying means; and compensation means coupling the output terminals of both shunt amplifying means together for making potentials on said input means relatively independent of one another.

2. The circuit of claim 1 wherein each said shunt feedback amplifying means includes:

a common emitter stage having a first transistor with its base coupled to an input means, its emitter coupled to the current source means and providing an output at its collector;

an emitter follower stage with a second transistor having its base coupled to the collector of the first transistor and its emitter coupled to the output terminal; and resistive feedback means coupling the base of the first transistor to the emitter of the second transistor.

3. The circuit of claim 2 wherein said compensation means includes two resistive elements coupled in series between the output terminals of said shunt feedback amplifying means and a third resistive element coupling that point common to both said resistive elements to a reference potential.

4. The circuit of claim 3 including:

a separate transistor coupling each of said inputs means to a reference potential when it is conducting;

a first current switch circuit having transistors with their collectors coupled to the base of the first of the separate transistors and their emitters coupled to a first current source to bias the first of the separate transistors nonconducting when any one of the mentioned transistors in the first current switch circuit are conducting;

a second current switch circuit having their collectors coupled to the base of the second of the separate transistors and their emitters coupled to a second common current source to bias the second of the separate transistors nonconducting when any of the mentioned transistors in the second current switch circuit are conducting;

a cross-coupling transistor with its emitter coupled to the first current source and its collector coupled to the base of the second of the separate transistors so that this cross-coupling transistor conducts while the mentioned transistors in the first current switch circuit are all biased nonconducting to bias the second of the separate transistors off; and means for biasing the separate transistors on while they are not held off by the current switch circuits whereby a data signal need be supplied only to the first of the current switch circuit.

5. A bit driver circuit for controlling the potential on two bit lines comprising:

a separate transistor coupling each of the bit lines to a reference potential when it is conducting;

a first current switch circuit having transistors with their collectors coupled to the base of the first of the separate transistors and their emitters coupled to a first current source to bias the first of the separate transistors nonconducting when any one of the mentioned transistors in this first current switch circuit are conducting;

a second current switch circuit having their collectors coupled to the base of the second of the separate transistors and their emitters coupled to a second common current source to bias the first of the separate transistors nonconducting when any of the mentioned transistors in the second current switch circuit are conducting;

a cross-coupling transistor with its emitter coupled to the first current source and its collector coupled to the base of the second of the separate transistors so that this cross-coupling transistor conducts while the mentioned transistors in the first current switch circuit are all biased nonconducting to bias the second of the separate transistors off; and means for biasing the separate transistors on while they are not held off by the current switch circuits whereby a data signal need be supplied only to the first of the current switch circuits.

* * * * *